United States Patent Office 2,794,719
Patented June 4, 1957

2,794,719

FUEL ANTIKNOCK

John D. Bartleson, Franklin, Mich., assignor to Ethyl Corporation, New York, N. Y., a corporation of Delaware No Drawing. Application August 13, 1953,
Serial No. 374,152

7 Claims. (Cl. 44—69)

This invention relates to the improvement of organolead material, and in particular to adjuvants for tetraethyllead and tetraethyllead-containing compositions.

Organolead compounds such as tetraphenyllead, tetramethyllead, tetraethyllead, dimethyldiethyllead, and the like have long been known as antiknock agents for fuel for spark ignition type internal combustion engines. Of such materials, however, only tetraethyllead has attained commercial success because of its efficacious attributes. Likewise, it has long been known that the effective utilization of such antiknock agents is enhanced by providing antiknock fluids which consist of organic halogen compounds in admixture with an organolead compound.

Organolead compounds suffer one disadvantage, particularly during storage, handling, and blending operations, namely, their inherent instability. Thus, tetraethyllead and related compounds are susceptible of deterioration which is largely dependent upon the nature of the environment. For example, it has been found that organolead antiknock agents and antiknock fluids containing the same, when in contact with certain metals, such as copper and copper-containing alloys, tend to deteriorate, even in a reducing atmosphere. Such deterioration is postulated to result from an adverse catalytic activity exhibited by such materials. In other words, it is generally believed that copper and like metals act as self-perpetuating decomposition accelerators. Another condition enhancing the deterioration of such antiknock agents is contact with air. It is generally believed that atmospheric constituents, notably oxygen and ozone, tend to oxidize one or more of the lead-to-carbon bonds with the formation of insoluble decomposition products. Under these conditions there contemporaneously occurs a color change in the dyestuff normally present in antiknock fluids such that the visual identification of the product frequently becomes difficult, if not impossible. Organolead antiknock agents likewise decomposed on exposure to strong light, particularly sunlight. In this case the decomposition is attributed to the catalytic decomposition of the organolead compounds by ultra-violet light. It is apparent, therefore, that the exposure of tetraethyllead and tetraethyllead-containing composition to any or all of the above environments results in a number of operational difficulties, including loss of antiknock effectiveness, the formation of sludge and other types of sediment, and the like.

When organolead-containing compositions are utilized in internal combustion engines, other difficulties are frequently encountered. For example, in spite of the high degree of efficiency of the normal scavenger complement in antiknock fluids, the accumulation of engine deposits in the engine cannot be entirely prevented. Such decomposition is particularly prevalent when sparking ignition engines are operated under conditions of low speed and light load, such as encountered in metropolitan driving conditions. As a result of notable improvements in fuel antiknock quality which have been made in recent years, such deposits present but a few minor problems in low compression engines. However, because of the trend in the automotive industry of utilizing high compression engines in passenger cars and trucks, the accumulation of deposits results in a number of relatively serious problems, including increased detonation, deposit-induced autoignition or wild ping, spark plug fouling, reduction in exhaust life, and the like.

Of the problems previously enumerated, those of wild ping, spark plug fouling, and reduced exhaust valve life are of considerable concern to the automotive industry. This results from the fact that each time the lead concentration in the fuel is raised to coincide with increases in compression ratio to eliminate detonation, the magnitude of one or more of these problems generally increases. As a result, there is a paramount need existing for a new and improved method for altering the physical and chemical characteristics of deposits and for modifying the combustion process such that the well-known detrimental effects of the previously described deposit-induced engine phenomena can be markedly suppressed or be eliminated.

It is, therefore, an object of this invention to provide adjuvants for organolead compounds. It is likewise an object of this invention to provide means of improving compositions such as antiknock fluids and fuels which contain organolead antiknock agents. Similarly, the provision of improved organolead compositions is another object of this invention. A particular object of this invention is to provide improved tetraethyllead-containing fuels, especially those for use in spark ignition type internal combustion engines. In addition, an object of this invention is to provide methods of improving anti-knock fluids such that during compounding, storage, and blending operations such materials are stabilized against the adverse effects of deteriorative environments. An additional object of the instant invention is to provide means of obviating deposit-induced phenomena of the character described hereinbefore. Other important objects of this invention will be apparent from the discussion hereinafter.

It has now been found that the above and other objects of this invention are attained by providing compositions of matter adapted for use as additives to fuel for spark-fired internal combustion engines comprising an organolead antiknock agent, and, in quantity sufficient to stabilize or improve said agent, a product obtained by reaction between a phosphorus sulfide and an organic compound in which at least one carbon atom is substituted with at least one univalent radical composed solely of a group VI–B element and hydrogen. Therefore, the adjuvants of this invention are formed by reaction between such compounds as phosphorus pentasulfide ($P_2S_5$), phosphorus heptasulfide ($P_4S_7$), or the like and an aliphatic, alicyclic or aromatic compound containing at least one univalent radical selected from the group consisting of hydroxyl, sulfhydryl, selenohydryl, and tellurohydryl. It will thus be apparent that my organolead adjuvants result from the interaction between a reactive phosphorus sulfide and such compounds as alcohols, mercaptans, seleno alcohols, telluro alcohols, phenols, thiophenols, seleno phenols and telluro phenols as well as compounds containing mixtures of the several group VI–B-containing functional radicals as defined hereinabove. For the sake of conciseness, such materials are termed hereinafter as the organic reactants.

When the organic reactant used to prepare my organolead adjuvants is an alcohol, it can be either monohydric or polyhydric, that is, the alcohol can contain one or a plurality of hydroxyl groups. Typical alcohols so used are exemplified by the alkyl alcohols, alkenyl alcohols, alkynl alcohols, cycloalkyl alcohols and cycloalkenyl alcohols. In other words, I can prepare my organolead adjuvants from any of the monohydric or polyhydric alcohols known in the art as aliphatic or alicyclic alcohols. More specifically, the alkyl alcohols, which preferably should contain from 1 to about 20 carbon atoms are illustrated by a methanol, ethanol, propanol, isopropanol, and likewise the various straight and branched chain alkyl alcohols exemplified by the several butyl, amyl, hexyl, heptyl, octyl, and like alcohols up to and including about eicosyl. Similarly, recourse can be made to comparable glycols, such as ethylene glycol, propylene glycol, butylene glycol, polypropylene glycols, glycol ethers, and the like as well as related materials which are tri- or tetra-substituted hydroxyl-containing organic reactants. The alkenyl alcohols are typified by such substances as allyl alcohol, crotyl alcohol and similar substances which contain at least one carbon-to-carbon double bond in the organic residue. In this embodiment, it is preferable to utilize alkenyl alcohols containing from 3 to about 20 carbon atoms. The alkynl alcohols which can be used in preparing the organolead adjuvants of my invention are illustrated by such materials as propynol, butynol, butyndiol, pentyndiol, and the like in which the straight or branched carbon chain containing at least one acetylenic linkage contains from 3 to about 20 carbon atoms. Such compounds as cyclohexanol, methylcyclohexanol, diethylcyclohexanol, α-hydroxy-2,3,4,5,6,7,8-heptahydronaphthalene, β-hydroxy-1,3,4,5,6,7,8-heptahydronaphthalene, and analogous materials are illustrative of cycloalkyl alcohols, that is, alcohols in which a cycloalkyl nucleus is substituted with at least one hydroxyl function. In general, such materials should preferably contain from 6 to about 30 carbon atoms in the molecule. Typical cycloalkenyl alcohols include the several cyclohexenols, cyclohexenediols, and like materials which preferably contain from 5 to about 20 carbon atoms in the molecule.

It will be apparent to one skilled in the art that thiols, frequently termed mercaptans are substantially analogous to alcohols. Consequently, in preparing the organolead adjuvants of my invention recourse can be made to substances differing from the above-described alcohols only to the extent that the hydroxyl group is replaced by a sulfhydryl group. Thus, the organic reactant used to prepare my adjuvants can be exemplified by such compounds as methyl mercaptan, ethyl mercaptan, propyl mercaptan, isopropyl mercaptan, 1,2-ethane dithiol, allyl mercaptan, butyn dithiol, cyclohexyl mercaptan, cyclohexene thiol, and analogous compounds. In general, it is preferable to utilize mercaptans which contain up to about 30 carbon atoms in the molecule.

As indicated hereinbefore both seleno alcohols and telluro alcohols can be used as organic reactants in preparing the adjuvants of this invention. It will be appreciated that these substances are substantially analogous to alcohols with the exception that the hydroxyl function is replaced either by a selenohydryl group or a tellurohydryl groups. As in the case of the mercaptans, it is preferable to employ seleno alcohols and telluro alcohols which contain up to about 30 carbon atoms in the molecule.

Because of their greater availability as articles of commerce and their generally superior chemical and physical characteristics, the alcohols and mercaptans as above-described are preferred over the seleno and telluro alcohols.

The aromatic organic reactants comprise phenols, thiophenols, seleno phenols and telluro phenols.

The phenols utilized to prepare the organolead adjuvants of this invention can be monohydric phenols, or polyhydric phenols. In the former group I prefer to utilize such phenols as the diverse monohydroxy substituted benzenes, naphthalenes, hydronaphthalenes, and the like as well as suitably substituted derivatives thereof. Thus, in preparing my adjuvants I utilize such phenols as phenol, ortho-, meta-, and para-cresols, xylols, such as 1,2-dimethyl-3-hydroxy benzene, 1,2-diethyl-4-hydroxy benzene, 1,3-dimethyl-2-hydroxy benzene, 1,3-dipropyl-4-hydroxy benzene, 1,3-diisopropyl-5-hydroxy benzene, 1,4-dimethyl-2-hydroxy benzene, thymol, carvacrol, cardanol phenols, mesitol, and the like. The latter class of phenols which are used as the organic reactant in the preparation of the adjuvants of this invention, that is, the polyhydric phenols, is illustrated by such materials as pyrocatechol, resorcinol, hydroquinone, orcinol, hydroxyhydroquinone, phloroglucinol, butylphloroglucinol, 1,2,3,4-tetrahydroxy benzene, 1,2,3,5-tetrahydroxy benzene, 1,2,4,5-tetrahydroxy benzene, pentahydroxy benzene, hexahydroxy benzene, 1,4-dihydroxy anthracene, 2,6-dihydroxy anthracene, 4,5,9-trihydroxy anthracene, and the like.

Thiophenols are substantially analogous to phenols. Therefore, thiophenols corresponding to the phenols of the character described hereinbefore can likewise be utilized as the organic reactant in the preparation of my adjuvants. It will thus be apparent that both mono- and polythiophenols can be utilized in this manner. Typical mono functional thiophenols include such materials as the mono sulfhydryl-substituted benzenes, naphthalenes, hydronaphthalenes, and the like as well as suitably substituted derivatives thereof. More specifically, such materials are exemplified by thiophenol, o-methylthiophenol, m-methylthiophenol, p-methylthiophenol, 1,2-dimethyl thiophenol, 1,3-dipropyl thiophenol, 1,4-diisopropyl thiophenol, 1,3-dimethyl thiophenol, 1-methyl-4-ethyl thiophenol, and the sulfur analogs of thymol, carvacrol, mesitol, and the like. The poly functional thiophenols are typified by 1,2-benzene dithiol, 1,3-benzene dithiol, 1,4-benzene dithiol, 1-methyl-3,5-benzene dithiol, 1,2,4-benzene trithiol, 1,3,5-benzene trithiol, 1,2,3,4-benzene tetrathiol, 1,2,3,5-benzene tetrathiol, 1,2,4,5-benzene tetrathiol, benzene pentathiol, benzene hexathiol, 1,4-naphthalene dithiol, and the like.

The aromatic organic reactants parallel the aliphatic and alicyclic organic reactants insofar as the existence of seleno and telluro derivatives is concerned. That is to say, a somewhat scarce but nevertheless operative class of reactants utilized in the preparation of my organolead adjuvants comprises the seleno phenols and telluro phenols. It will be apparent that such compounds are substantially analogous to the phenols and thiophenols as above-described with the exception that the one or more oxygen or sulfur-containing univalent radicals are replaced by the corresponding selenium and tellurium functions.

With the aromatic organic reactants, it is preferred to employ the phenols and thiophenols because of their lower cost, greater availability, and their generally superior physical and chemical attributes.

While the organic reactants described thus far generally represent single chemical entities, it is frequently preferred to utilize as the reactant mixtures of the various materials, especially mixtures which are readily available as articles of commerce. For example, typical mixtures of organic compounds in which at least one carbon atom is substituted with at least one univalent radical composed solely of a group VI–B element and hydrogen are readily available as products from fermentation and destructive distillation processes. In such a case, the mixture consists of various alcohols. Other readily available mixtures which can be utilized in the preparation of my organolead adjuvants include mixed mercaptans prepared by the interaction of mixed alkyl halides and the mono potassium salt of hydrogen sulfide in alcoholic solution, and mixed phenols obtained by heating mixtures of aryl halides with dilute aqueous sodium hydroxide in the presence of copper salts in autoclaves at high temperatures. Other readily available mixtures of organic reactants will become apparent to those skilled in the art.

The phosphorus sulfide, the other prime reactant utilized in the preparation of my adjuvants is preferably a reactive compound such as $P_2S_5$ ($P_4S_{10}$) and $P_4S_7$. It is possible, however, to use certain of the other reported phosphorus sulfides under the proper reaction conditions. Furthermore, another related reagent which can be successfully utilized in preparing my reaction products is thiophosphoryl chloride, PSCl₃. It will likewise be apparent that under suitable conditions the various sulfides of arsenic or antimony can be similarly employed in forming organolead adjuvants for use in the present invention.

The adjuvants of this invention are readily prepared, the reaction generally requiring only the addition of a reactive phosphorus sulfide to the organic reactant and heating the mixture at a temperature at which the reaction takes place as evidenced by the release of hydrogen sulfide until the reaction is substantially complete. The temperature of the reaction is largely dependent upon the nature of the individual reactants although, generally speaking, temperatures in the order of about 140 to about 500° F. are satisfactory. In preparing some of the adjuvants of my invention advantages are to be obtained by conducting the reaction under superatmospheric pressure which can be readily obtained by conducting the reaction in a closed vessel thereby taking advantage of the pressure resulting from the hydrogen sulfide so formed.

The nature of the reaction products forming the organolead adjuvants of this invention is contingent to a considerable degree upon the ratio of the reactants. That is to say, variations in the character of my adjuvants are achieved by utilizing different organic reactant-to-phosphorus sulfide atom ratios from between about 0.5 to 1 to about 10 to 1.

The reaction products, that is, the adjuvants of this invention, can be made in the presence of a diluent, if desired, which may or may not be subsequently removed. Such diluents are illustrated by such substances as kerosene, straight run and catalytically cracked hydrocarbons of the diesel fuel boiling range and the like.

The reaction products used as organolead adjuvants in accordance with this invention defy precise chemical definition. For example, in Kosolapoff, "Organo Phosphorus Compounds," it is stated that there is very little reliable information about the products obtained when the ratio of alcohol or phenol to phosphorus pentasulfide differs from 4 to 1. Nevertheless, it is known that the magnitude of the organic reactant-to-phosphorus sulfide ratio employed contributes a considerable effect upon the nature of my adjuvants.

For example, when a low organic reactant-to-phosphorus pentasulfide ratio is employed, that is, a ratio from between about 0.5 to 1 to about 2 to 1, it is generally believed that the reaction products contain a substantial proportion of material containing the characteristic chemical bonding, $(HS-)(S=)P(AC)_2$ wherein A is either oxygen, sulfur, selenium or tellurium depending upon the nature of the organic reactant. On the other hand, when a high organic reactant to $P_2S_5$ ratio is employed which ratio is from about 3 to 1 to about 10 to 1, it is presumed by those skilled in the art that a substantial proportion of the product contains the characteristic grouping $(S=)P(A-C)_3$ wherein as before A represents a group VI–B element. Thus, it would appear that although the reaction is believed to involve chemical combination between the hydrogen atom of the functional group of the organic reactant and the phosphorus sulfide, the reaction mechanism is obscured by a number of concurrent effects including the operation of the law of mass action, reaction kinetics, steric factors as well as consideration of the nature of the prime reactants employed. It may well be that with certain pure starting materials and with carefully controlled reaction conditions and concentrations substantially pure reaction products are obtainable. However, an advantage inherent in this invention is the fact that it is not necessary to prepare substantially pure materials and further that it is generally preferred to utilize the reaction product in toto as an organolead adjuvant.

The organolead antiknock agent utilized in the compositions of matter of the present invention consists of an organolead compound in which lead is directly bonded to carbon atoms. Such compounds are exemplified by the lead aryls such as tetraphenyllead, and the lead alkyls such as tetramethyllead, tetraethyllead, tetrapropyllead, tetrabutyllead, dimethyldiethyllead, methyltriethyllead, and the like as well as mixtures of such compounds. Because of the generally superior characteristics of tetraethyllead and the ready accessibility thereof as an article of commerce, it constitutes a preferred embodiment of the organolead antiknock agent utilized in accordance with the instant invention.

With the various compositions within the scope of this invention the proportion of the reaction product utilized in conjunction with an organolead compound is such that there is a total of from between about 0.01 to about 0.80 theory of phosphorus. In this regard a theory of phosphorus is defined as the amount of phosphorus theoretically required to react with the lead to form lead orthophosphate, which quantity is two atoms of phosphorus per three atoms of lead. However, generally speaking, it is sufficient to employ an amount of an organolead adjuvant of this invention such that there is an amount of phosphorus between about 0.05 and about 0.5 theory with the best overall results usually being obtained with amounts of about 0.1 to about 0.2 theory of phosphorus, the last mentioned concentrations constituting a preferred embodiment.

Regarding many of the problems frequently associated with high octane quality fuel, an anomalous situation obtains. On one hand, an effective adjuvant for organolead compounds should possess stability against deterioration in common environments, compatibility with the chemical entities with which it comes in contact, and volatility so as to possess the characteristic frequently referred to as engine inductibility. On the other hand, the mere selection of a phosphorus compound to acquire the optimum characteristics enumerated above does not necessarily assure the effectiveness of the compound in combatting such phenomena as spark plug fouling, wild ping and the like. It is entirely probable that some empirical relationship between physical properties and effectiveness in the obviation of such problems exists, but as yet the state of the art does not contain a satisfactory relationship of this type. However, the phosphorus materials within the purview of this invention, for the most part, possess the requisite physical properties adapting them for use as organolead adjuvants and at the same time are effective in obviating engine problems of the type described hereinbefore.

It will be apparent that there exists a number of variations in employing the adjuvants of this invention. For example, a facet of this invention involves the provision of a mixture of an organolead antiknock agent such as a lead alkyl and a reaction product containing both phosphorus and at least one group VI–B element of the type described above. In such a case, the resulting composition can be blended with hydrocarbon fuel of the gasoline boiling range to provide an improved fuel composition which under certain circumstances does not require the utilization of organic halogen-containing material as a scavenger. It is believed that under these conditions the presence of a quantity of phosphorus as above-described and chemically bonded in accordance with the requirements of the reaction product containing both phosphorus and at least one group VI–B element used in this invention contributes sufficient scavenging action such that the amount of deposition in the engine is suitably controlled, notwithstanding the fact that lead phosphates generally have high melting points. Likewise, in this embodiment of the instant invention the general storage characteristics of organolead compounds are frequently enhanced.

Of perhaps more practical importance is a second variant of this invention, namely the utilization of the aforesaid reaction product containing both phosphorus and at least one group VI–B element in organolead-containing antiknock fluids. It is well-known in the art that the most convenient means of marketing and blending organolead antiknock agents is in the form of an antiknock fluid which usually contains, in addition to the lead compound, one or more organic bromine and/or chlorine compounds and an organic dye for identification purposes. On occasion such antiknock fluids likewise contain minor proportions of diluents, antioxidants, metal deactivators and the like. In line with the foregoing, therefore, a preferred embodiment of this invention involves providing improved antiknock fluids containing the requisite concentration of the above-described reaction product containing both phosphorus and at least one group VI–B element. Such improved antiknock fluids generally do not require the presence of a solubilizing agent or a stabilizer since the phosphorus compound itself is generally sufficiently miscible with the constituents of the antiknock fluid and imparts thereto a degree of stabilization. However, under some conditions additional benefits are to be derived by employing in the improved antiknock fluids of this invention the necessary quantities of such materials.

Still another variant of the present invention consists of providing improved fuel compositions. These normally consist of hydrocarbons of the gasoline boiling range containing a minor proportion of the aforesaid antiknock fluids of the present invention. It will be appreciated that the quantity of the antiknock fluid of the present invention utilized in my improved fuel compositions is primarily contingent upon the use for which the gasoline is intended. That is to say, when the fuel is intended for use in automotive engines such as passenger cars, trucks, buses and the like, an amount of any of my improved antiknock fluids equivalent to a lead content in the gasoline of from between about 0.53 and about 3.17 grams of lead per gallon is satisfactory. Thus, in the embodiments of this invention wherein I employ tetraethyllead as an antiknock agent such concentrations are equivalent to from between about 0.5 and about 3 milliliters of the compound per gallon. With the advent of the more recent high compression ratio internal combustion engines, however, it is becoming increasingly apparent that benefits are to be derived by employing somewhat greater concentrations of the organolead material in automotive gasoline. On this basis, therefore, automotive fuels containing up to about 4.75 grams of lead per gallon are contemplated. In contrast, when the improved antiknock fluids of the present invention are utilized in fuel for aviation engines somewhat higher concentrations are employed. Generally speaking, amounts of lead up to about 6.34 grams of lead per gallon can be utilized although somewhat lesser quantities are presently in vogue. In other words, in the tetraethyllead-containing embodiments of this invention there can be present up to about 6 milliliters of tetraethyllead per gallon as an improved antiknock fluid of my invention. Concentrations above these limits can be employed in both motor and aviation fuels, practical considerations being the prime criterion for establishing the upper concentration limit. As indicated hereinabove, in all of the compositions of the present invention the amount of phosphorus is fixed within the limits above-described. Thus, in the preferred fuel embodiments of my invention there is present an amount of phosphorus as a reaction product containing both phosphorus and at least one group VI–B element such that there is from about 0.1 to 0.2 theory of phosphorus. In preparing the improved fuel compositions of this invention, it is usually necessary only to add the requisite quantity of the improved fluid to the fuel and by means of stirring, shaking or other means of physical agitation homogeneous fuel compositions are provided. Although the simplest means of preparing such fuels is to blend therewith the necessary quantity of an improved antiknock fluid of this invention, it is possible to add a conventional antiknock fluid to the fuel and subsequently blend therewith the necessary quantity of the reaction product containing both phosphorus and at least one group VI–B element. In addition to reversing this order of addition of conventional antiknock fluids and reaction product containing both phosphorus and at least one group VI–B element, another variant within the purview of this invention is to blend with the fuel each of the individual constituents of my antiknock fluids separately.

The following specific examples wherein all parts and percentages are by weight are illustrative of the methods which can be employed in preparing the organolead adjuvants of this invention.

*Example I*

To a suitable glass reaction vessel equipped with an electric heating mantle and a stirrer is added 250 parts of 2-ethylhexanol and 750 parts of virgin gas oil. To this mixture is then added 222 parts of phosphorus pentasulfide ($P_2S_5$). The temperature of the vessel is then raised to 250° F. and maintained at this temperature for a period of about two hours while vigorously agitating the reactants. Upon completion of the reaction the product is subjected to centrifugation and filtration so as to remove the minor quantities of undesirable products which are formed.

*Example II*

In a suitable reaction vessel are placed 149 parts of amyl mercaptan and 222 parts of phosphorus heptasulfide ($P_4S_7$). The temperature of the reactants is then raised to 325° F. and maintained at this temperature for four hours while continuously agitating the mixture. At the end of this time the reaction mass is diluted with an equal volume of toluene. The solution is then allowed to stand for fifteen minutes during which time minor amounts of solid products have settled to the bottom of the container. These are removed by subjecting the entire product to filtration.

*Example III*

To a glass reaction vessel equipped with electric heating means and a stirrer is added a mixture of 500 parts of mixed cresols dissolved in 1500 parts of 225 red oil, which is a low viscosity acid refined lube oil fraction. To this mixture is added 444 parts of $P_2S_5$. While continuously stirring the mixture the temperature is maintained at 245° F. for four hours. At the end of this period the entire reaction mixture is subjected to centrifugation and filtration and then is blown with air for a period of fifteen minutes.

*Example IV*

A mixture consisting of 360 parts of thiophenol, 800 parts of xylene, and 165 parts of thiophosphoryl chloride ($PSCl_3$) is placed in a glass reaction vessel. The temperature of the mixture is raised to the reflux temperature while contemporaneously passing air through the mixture. The reaction is allowed to proceed until it is substantially complete which takes about sixteen hours. The entire mixture is then subjected to repeated washings with water so as to remove quantities of HCl which remain in solution.

The reactants and reaction conditions described in the previous specific examples are merely illustrative. For example, by utilizing the above and similar reaction conditions it is possible to prepare suitable adjuvants of this invention by reacting a phosphorus sulfide such as $P_2S_5$, $P_4S_7$ and the like with such organic reactants as dodecyl mercaptan, terpineol, mixed amyl alcohols, mercaptoethanol, $\beta,\beta'$-dihydroxydiethyl ether and the like. Furthermore, as indicated previously it is possible to utilize thiophosphoryl chloride in forming the adjuvants of this invention. When this is done and a low organic reactant-to-thiophosphoryl chloride mole ratio is employed hydrolytic treatment with hydrogen sulfide should follow the thermal step. Generally speaking, such low mole ratios are in the order of from about 1 to 1 to 2 to 1, although minor deviations from these ratios can be utilized. When a high organic reactant-to-thiophosphoryl chloride mole ratio is employed such hydrolytic treatment is generally unnecessary. In such a case, however, it is frequently desirable to conduct the reaction in the presence of a hydrogen chloride acceptor such as amines, pyridines and the like.

To illustrate the effectiveness of the improved antiknock fluids of the present invention consideration can be given to the problem of spark plug fouling. In order to do this, recourse can be made to the following general test procedure utilizing a standard modern V-8 engine equipped with overhead valves having a 3¾" bore, a 3⅞₆" stroke, a 303.7 cubic inch displacement and a compression ratio of 7.25 to one equipped with commercially available spark plugs. In order to establish a base line this engine is operated in conjunction with an engine dynamometer on a standard commercial fuel containing 3 milliliters of tetraethyllead per gallon as conventional antiknock fluid containing 0.5 theory of bromine as ethylene dibromide and 1.0 theory of chlorine as ethylene dichloride. This is operated under a durability schedule used for spark plug deposit accumulation patterned after road conditions experienced in city driving which are known to produce spark plug fouling of the greatest magnitude. Such operation is substantially continuous until a number of spark plug failures is detected thereby establishing a quantitative measure of the degree of spark plug fouling which can be expressed in average hours to plug failure. The engine is then freed from deposits and equipped with new spark plugs. The same procedure is repeated using the same fuel base stock to which is added an improved antiknock fluid of the present invention.

By way of example, when 300 gallons of a petroleum hydrocarbon fuel available as an article of commerce is treated with 900 milliliters of tetraethyllead in a fluid containing tetraethyllead, 0.5 theory of bromine as ethylene dibromide and 1.0 theory of chlorine as ethylene dichloride, a suitable fuel is prepared for establishing a base line of hours to spark plug failure. When the standard V-8 engine described hereinbefore is then operated on this homogeneous fuel composition it is found that in an average time of about 34 hours 3 spark plug failures have occurred.

In contrast, when a suitable quantity of the same fuel base stock is treated with an improved antiknock fluid of the present invention greatly enhanced spark plug life is obtained. For example, when 1000 gallons of the same fuel base stock is treated with 3 liters of tetraethyllead as a fluid comprising 0.5 theory of bromine as ethylene dibromide, 1.0 theory of chlorine as ethylene dichloride, and 0.2 theory of phosphorus as the reaction product between $P_2S_5$ and amyl mercaptan, an improved fuel of the present invention results. Upon intimately mixing the aforementioned components the homogeneous fuel composition containing 3.0 milliliters of tetraethyllead per gallon is suitable for use in the above-described engine test procedure. It is found that a substantial improvement in spark plug performance as evidenced by the greater period of continuous engine operation results from the utilization of such an improved fuel of the present invention. That is to say, the average hours to three spark plug failures is substantially in excess of the base line figure of 34 hours.

When such adjuvants as those formed by the interaction of a phosphorus sulfide with cardanol, p-amyl thiophenol, cyclohexanol and the like are utilized in accordance with the present invention comparable effectiveness regarding minimization of spark plug fouling is obtained. Without desiring to be bound by the following explanation regarding the enhanced effectiveness of the adjuvants of this invention, a tenable explanation apparently involves a proper balance between physical properties such as stability, volatility, solubility, compatibility and the like and the energy relationships or ease of decomposition which may contribute to the overall effectiveness of my adjuvants by facilitating decomposition at the proper instant in the engine cycle.

To still further illustrate the enhanced effectiveness of the organolead-containing compositions of the present invention consideration can be given to the problem of wild ping. To demonstrate the effectiveness of my compositions in this regard, I can subject both a hydrocarbon fuel treated in accordance with this invention and another portion of the same hydrocarbon fuel treated with a conventional antiknock mixture to a test procedure involving the use of a single cyclinder CFR knock test engine equipped with an L-head cylinder and a wild ping counter which records the total number of wild pings which have occurred during the test periods. Such apparatus includes an extra spark plug used as an ionization gap which is installed in a second opening in the combustion chamber. A mechanical breaker switch driven at camshaft speed is also provided which, when closed, makes the wild ping counter ineffective for the duration of the normal flame in the combustion chamber. The breaker is open for 80 crankshaft degrees between 70° B. T. C. (before top dead center) and 10° A. T. C. (after top dead center). If a flame front induced early in the cycle by deposits reaches the ionization gap during this open period, the counter registers a wild ping regardless of the audible manifestations. During normal combustion with ignition timing at T. D. C. (top dead center) the flame front reaches the ionization gap at 15 to 18° A. T. C. during the period wherein the points are closed and no count is made. The actual test procedure consists essentially of operating the test engine initially having a clean combustion chamber under relatively mild cycling conditions for deposit formation until an equilibrium with regard to deposit-induced autoignition is reached. The effect of fuels treated in accordance with the instant invention is determined by comparing the test results obtained using the fuel treated with a reaction product containing both phosphorus and at least one group VI–B element with those obtained using a fuel treated with a conventional antiknock mixture. Since the weld ping counter records the total number of wild pings which have occurred during the test procedures a quantitative expression for the amount of deposit-induced autoignition is the number of wild pings per hour of operation. The effectiveness of my improved fuel composition in virtually eliminating deposit-induced autoignition will be apparent from the following specific examples.

*Example V*

To 100 gallons of a commercially available blend of straight run, catalytically cracked and polymer blending stocks was added and thoroughly mixed 300 milliliters of tetraethyllead as an antiknock fluid comprising tetraethyllead, 0.5 theory of bromine as ethylene dibromide, and 1.0 theory of chlorine as ethylene dichloride. The resulting homogeneous fuel composition was then utilized as the fuel in the previously designated single-cylinder laboratory test engine to formulate a base line of wild ping. It was found that there were 135 wild pings per hour of engine operation.

*Example VI*

An improved antiknock fluid composition of the present invention is prepared by adding 0.1 theory of phosphorus as the product obtained by reaction between $P_2S_5$ and 2-ethylhexanol to 150 milliliters of tetraethyllead as an antiknock fluid comprising tetraethyllead, 0.5 theory of bromine as ethylene dibromide, and 1.0 theory of chlorine as ethylene dichloride. A homogeneous fluid composition is obtained by intimately mixing the aforementioned components. The entire quantity of improved antiknock fluid composition so prepared is added to 50 gallons of a commercially available blend of straight run, catalytically cracked and polymer blending stocks. Upon mechanically agitating the resulting mixture a homogeneous fuel composition is prepared. The laboratory single-cylinder test engine as described previously is then operated on this improved fuel composition while contemporaneously determining the rate of wild pings as detected by the wild ping counter. It is found that the utilization of an improved antiknock fuel of the present invention greatly minimizes the rate of wild pings expressed in wild pings per hour as contrasted with a conventional fuel which produces 135 wild pings per hour. Consequently, an improved fuel composition of this invention results in a substantial reduction in this deposit-induced engine phenomenon.

The foregoing specific examples are merely illustrative of the beneficial effects produced by the improved organo-lead-containing compositions of the present invention. It will be apparent that it is preferred to utilize the adjuvants of this invention such as the reaction products of a phosphorus sulfide and such materials as capryl alcohol, 2-ethyl butanol, benzyl mercaptan, hydroquinone, methylcyclohexanol, ethyl mercaptan and the like in high octane quality fuel because of the fact that most of the deposit-induced problems exist on combustion of such fuels.

The superior effectiveness of the preferred embodiments of this invention, namely a reaction product containing both phosphorus and at least one group VI–B element in the diminution of deposit-induced engine problems is further unexpected when considering the prime constituents phosphorus and sulfur which are contained therein. On the one hand, both sulfur and phosphorus compounds have heretofore been judiciously avoided as much as possible in fuel because of their notorious deleterious effects particularly in the realm of organolead antagonism and the like. In the case of sulfur, for example, refiners have long been resorting to various means of removing sulfur compounds from hydrocarbons of the gasoline boiling range because of their recognized deleterious effects on antiknock activity, engine cleanliness, storage stability, and the like. However, the adjuvants of this invention possessing considerable proportions of phosphorus and sulfur do not bring about such deleterious effects. Furthermore, another surprising effect has been noted, namely the fact that the presence of phosphorus-to-sulfur bonds produces a greater effectiveness regarding wild ping than that exhibited by compounds possessing either phosphorus or sulfur and likewise, a mixture of phosphorus- and sulfur-containing compounds. This fact is evidenced by the findings that the presence of added sulfur in a conventional leaded fuel not only has no beneficial effect on wild ping but actually results in an increase in this phenomenon. By way of example, it was found that the addition of 5 theories of sulfur as a mixture consisting of one theory of di-t-butyl disulfide, 2 theories of dibutyl sulfide and 2 theories of thiophene, a mixture representative of the average sulfur constituents of petrolenum hydrocarbon fuel, to a conventional gasoline containing 3 milliliters of tetraethyllead per gallon resulted in a wild ping rate of 93 wild pings per hour. In contrast, the same fuel containing the same concentration of tetraethyllead produced 74 wild pings per hour. Thus, the incorporation of sulfur-containing compounds different from the sulfur-containing adjuvants utilized in this invention resulted in a wild ping rate amounting to 125 percent of the base line. That is to say, the presence of sulfur-containing compounds generally increases the rate of wild ping whereas the presence of a considerable amount of sulfur when suitably bonded in accordance with the present invention results in a definite improvement in this deposit-induced phenomenon. In view of the foregoing, therefore, the apparent conclusion to be reached is that the chemical bonds between the two prime elements making up my adjuvants in some currently unexplainable manner produced enhanced effectiveness with regard to deposit-induced engine phenomena without resulting in secondary deleterious problems normally attributed to the presence of each of the elements when used separately or as mixtures of individual phosphorus- and sulfur-containing compounds.

As indicated, an additional important advantage obtained from practicing this invention is the fact that my adjuvants have little or no antagonistic effect upon the antiknock agent used in the fuel. In line with the enhanced effectiveness of my organolead adjuvants this surprising benefit regarding a minimum of organolead destructiveness is perhaps associated with the degree of oxidative stability inherent in a reaction product containing both phosphorus and at least one group VI–B element. In other words, it is not inconceivable that my organolead adjuvants are capable of decomposing at the proper instant in the engine cycle so as to exhibit the beneficial effect regarding deposit-induced engine problems while at the same time decomposing at a time during the engine cycle sufficiently far removed from the point at which the organolead compound exerts its beneficial antiknock activity.

Because of their adaptability the adjuvants of the present invention can be successfully utilized with any of the well known organolead antiknock agents as indicated hereinbefore. Likewise, insofar as the halide scavengers are concerned, the reaction product containing both phosphorus and at least one group VI–B element used in this invention can be employed in antiknock fluids and fuels containing such materials as ethylene dibromide, ethylene dichloride, mixed dibromotoluenes, trichlorobenzenes, and in general such organic halide scavengers as those disclosed in U. S. 1,592,954; 1,668,022; 2,364,921; 2,398,281; 2,479,900; 2,479,901; 2,479,902; 2,479,903; and 2,496,983. Likewise, the adjuvants of this invention can be used in conjunction with other well known motor fuel adjuvants such as antioxidants, organolead stabilizers, organic dyes, solubilizers, and indeed with other catalytically active materials frequently employed in fuel.

Having fully described the nature of the present invention, the need therefor, and the best mode devised for carrying it out, it is not intended that this invention be limited except within the spirit and scope of the appended claims.

I claim:

1. An antiknock additive for use in hydrocarbon fuels of the gasoline boiling range, said additive comprising an organo-lead antiknock agent and a product obtained by reaction between (1) an organic compound in which at least one carbon atom is substituted with at least one univalent radical composed solely of a group VI–B element and hydrogen, said radical being bonded to said carbon atom through said group VI–B element, said compound containing only elements selected from the group consisting of carbon, hydrogen, oxygen, sulfur, selenium and tellurium and (2) a phosphorus sulfide selected from the group consisting of $P_2S_5$ and $P_4S_7$, said reaction comprising heating from about 0.5 to about 10 moles of said compound per mole of said sulfide to a temperature at which hydrogen sulfide is released; said product being present in said additive in amount such that the phosphorus-to-lead atom ratio is from about 0.02/3 to about 1.6/3.

2. The additive of claim 1 further characterized in that the antiknock agent is a lead alkyl.

3. The additive of claim 1 further characterized in that the antiknock agent is tetraethyllead.

4. An antiknock additive for use in hydrocarbon fuels of the gasoline boiling range, said additive consisting essentially of tetraethyllead, a scavenging amount of organic halide material capable of reacting with the lead during combustion in a spark ignition internal combustion engine to form volatile lead halide, said material containing only elements selected from the group consisting of bromine, chlorine, carbon, hydrogen and oxygen; and a product obtained by reaction between (1) an organic compound in which at least one carbon atom is substituted with at least one univalent radical composed solely of a group VI–B element and hydrogen, said radical being bonded to said carbon atom through said group VI–B element, said compound containing only elements selected from the group consisting of carbon, hydrogen, oxygen, sulfur, selenium and tellurium, and (2) a phosphorus sulfide selected from the group consisting of $P_2S_5$ and $P_4S_7$, said reaction comprising heating from about 0.5 to about 10 moles of said compound per mole of said sulfide to a temperature at which hydrogen sulfide is released; said product being present in said additive in amount such that the phosphorus-to-lead atom ratio is from about 0.02/3 to about 1.6/3.

5. The additive of claim 4 further characterized in that said scavenging amount of organic halide material is about 0.5 theory of bromine as a bromohydrocarbon compound capable of reacting with the lead during combustion in a spark ignition internal combustion engine to form volatile lead bromide and about 1.0 theory of chlorine as a chlorohydrocarbon compound capable of reacting with the lead during combustion in a spark ignition internal combustion engine to form volatile lead chloride.

6. Hydrocarbon fuel of the gasoline boiling range adapted for use as fuel for spark ignition internal combustion engines containing up to about 6.34 grams of lead per gallon as an organolead antiknock agent, and a product obtained by reaction between (1) an organic compound in which at least one carbon atom is substituted with at least one univalent radical composed solely of a group VI–B element and hydrogen, said radical being bonded to said carbon atom through said group VI–B element, said compound containing only elements selected from the group consisting of carbon, hydrogen, oxygen, sulfur, selenium and tellurium, and (2) a phosphorus sulfide selected from the group consisting of $P_2S_5$ and $P_4S_7$, said reaction comprising heating from about 0.5 to about 10 moles of said compound per mole of said sulfide to a temperature at which hydrogen sulfide is released; said product being present in said fuel in amount such that the phosphorus-to-lead atom ratio is from about 0.02/3 to about 1.6/3.

7. The hydrocarbon fuel composition of claim 6 further characterized in that it contains from about 0.53 to about 4.75 grams of lead per gallon as tetraethyllead, about 0.5 to theory of bromine as a bromohydrocarbon compound capable of reacting with the lead during combustion in a spark ignition internal combustion engine to form volatile lead bromide, and about 1.0 theory of chlorine as a chlorohydrocarbon compound capable of reacting with the lead during combustion in a spark ignition internal combustion engine to form volatile lead chloride.

References Cited in the file of this patent

UNITED STATES PATENTS

| | | |
|---|---|---|
| 2,378,793 | Rudel | June 19, 1945 |
| 2,405,560 | Campbell | Aug. 13, 1946 |
| 2,534,217 | Bartleson | Dec. 19, 1950 |

FOREIGN PATENTS

| | | |
|---|---|---|
| 683,405 | Great Britain | Nov. 26, 1952 |